Patented Nov. 27, 1951

2,576,380

UNITED STATES PATENT OFFICE 2,576,380

CERAMIC DIELECTRICS COMPRISING ESSENTIALLY TITANIA

Jack Woodcock and John K. Paridge, Stourport-on-Severn, England, assignors to Steatite and Porcelain Products Limited, a corporation of Great Britain No Drawing. Application November 10, 1948, Serial No. 59,416. In Great Britain November 17, 1947

14 Claims. (Cl. 106—39)

This invention relates to ceramic dielectrics comprising essentially titania, either uncombined or combined with one or more of the oxides of magnesium, calcium, strontium or barium.

According to the present invention we provide improved ceramic dielectrics comprising essentially titania and optionally magnesia and/or one or more of the alkaline earth oxides, CaO, SrO, and BaO, characterised by the presence in the said dielectrics of nickel oxide in amounts equivalent to not more than 15% NiO.

Preferably the nickel oxide content does not exceed 5% the optimum amounts apparently being from 0.25–3%.

Bodies in accordance with the invention may also contain with advantage up to 15% zirconia and/or thoria, and/or up to 2% of tungstic and/or molybdic oxides. Where magnesia is present it may be necessary or desirable to limit the zirconia content to not more than about 5% to allow adequate resistance to thermal shock.

Bodies in accordance with the invention are produced in the customary way by first preparing a fine-milled powder from which the articles are formed and fired. In preparing the powder, the ingredients are wet-mixed, milled with water, dried, and crushed. The powder is then mixed with an organic plasticiser, for example flour paste, which is subsequently burned out in firing. The plastic mass is shaped by extrusion or other forming processes commonly known in industry to form tubes, plates or other articles which after drying out are fired at a temperature of 1400° C. or in accordance with the requirements of the particular type of body being fired as will be understood in the industry.

The ingredients from which the bodies are to be produced may be the separate oxides, i. e. nickel oxide, titania, zirconia, thoria, magnesia, and the alkaline earth oxides. For the purposes of the invention ordinary commercial black nickel oxide consisting mainly of NiO is a suitable material. Alternatively, the respective oxides may be replaced by equivalent amounts of other compounds capable of producing or reacting as the oxides during the firing process, as for example the carbonates of nickel, magnesium and the alkaline earths. Alternatively again, some or all of the ingredients of the body may themselves be pre-formed from oxides. Thus the simplest body composition would be made from titania and nickel oxide, but when say, zirconia is also to be present, the nickel oxide and zirconia may be pre-formed to nickel zirconate, and the body made from titania and the pre-formed nickel zirconate. Again, where magnesia and/or alkaline earth oxides are to be included they may be added in the form of magnesium zirconate, or magnesium or alkaline earth titanate.

Table 1 shows the composition, in terms of oxides present of a number of ceramic bodies in accordance with and illustrative of our invention, whilst Table 1A shows the nominal composition of the same bodies.

TABLE 1

*Percent composition*

| Oxides | Body No. | | | | | | | | | |
|---|---|---|---|---|---|---|---|---|---|---|
| | 1 | 2 | 3 | 4 | 5 | 6 | 7 | 8 | 9 | 10 |
| Titania, TiO$_2$ | 99.75 | 98.0 | 96.0 | 94.0 | 95.6 | 49.25 | 30.8 | 30.8 | 36.25 | 65.25 |
| Nickel Oxide, NiO | 0.25 | 0.8 | 0.4 | 0.4 | 1.0 | 0.5 | 10.0 | 4.02 | 2.0 | 1.0 |
| Zirconia, ZrO$_2$ | | 1.2 | 2.87 | 2.87 | | | 59.2 | 5.98 | 46.0 | 33.75 |
| Baria, BaO | | | | | | | | 59.2 | 15.25 | |
| Strontia, SrO | | | | | | 50.25 | | | | |
| Magnesia, MgO | | | 0.73 | 0.73 | | | | | | |
| Bentonite | | | | 2.0 | | | | | | |
| Ball Clay | | | | | 3.4 | | | | | |

TABLE 1A

*Percent nominal composition*

| Ingredients | Body No. | | | | | | | | | |
|---|---|---|---|---|---|---|---|---|---|---|
| | 1 | 2 | 3 | 4 | 5 | 6 | 7 | 8 | 9 | 10 |
| Titania | 99.75 | 98.0 | 96.0 | 94.0 | 95.6 | | | | | 47.65 |
| Magnesia | | | | | | 0.67 | | | | |
| Nickel Oxide | 0.25 | | | | 1.0 | 0.5 | 10.0 | | 2.0 | 1.0 |
| Nickel Zirconate | | 2.0 | 1.0 | 1.0 | | | | 10.0 | | |
| Barium Titanate | | | | | | | 90.0 | 90.0 | 70.0 | 51.35 |
| Strontium Titanate | | | | | | | | | 28.0 | |
| Magnesium Ortho-Titanate | | | | | | 98.83 | | | | |
| Magnesium Zirconate | | | 3.0 | 3.0 | | | | | | |
| Bentonite | | | | 2.0 | | | | | | |
| Ball Clay | | | | | 3.4 | | | | | |

Various types of bodies falling within the scope of our invention are represented inter alia by the bodies illustrated in Tables 1 and 1A. Thus bodies Nos. 1–5 are typical of "pure" titania bodies (containing over 90% $TiO_2$), No. 6 is a magnesium titanate body, whilst Nos. 7–9 are alkaline earth titanate bodies, and No. 10 is a mixed titania/alkaline earth titanate body. It will be observed that bodies Nos. 4 and 5 contain bentonite and ball clay respectively.

Table 2 shows the dielectric constants and power factors at room temperature of the bodies enumerated 1–10 in Tables 1 and 1A. The figures in brackets indicate the corresponding electrical properties of other bodies not in accordance with the invention but of comparable types. The effect of the addition of fluxes is illustrated by comparing the properties of body No. 2 with No. 5 which is somewhat similar but with the addition of a small amount of clay, and of body No. 3 with No. 4 which is identical except for the addition of 2% bentonite. The power factors at both low and high frequencies of the bentonite and clay fluxed bodies are appreciably higher than those of the unfluxed bodies, but even so the bodies 4 and 5 compare very favourably with their respective comparable types outside the scope of the invention.

TABLE 2

| Body No. | Dielectric Constant | Power Factor $\times 10^{-4}$ | |
|---|---|---|---|
| | | 1 Kilocycle | 2 Megacycles |
| 1 | 112 (99) | 8 (30–40) | Less than 1 (2–5). |
| 2 | 98.5 (80–90) | 10 (30–40) | Less than 1 (2–5). |
| 3 | 88 (80–90) | 3 (80–90) | Less than 0.5 (3–10). |
| 4 | 82 (80–90) | 15 (60–300+) | 2 (5–10). |
| 5 | 80 (80–90) | 20 60–300+) | 3 (5–10). |
| 6 | 15 (12–18) | 5 (10–20) | Less than 1 (2–5). |
| 7 | 1230 (1570) | 15 (200+) | |
| 8 | 2900 (1570) | 30 (200+) | |
| 9 | 1620 (11,200) | 20 (70–200) | |
| 10 | 40 | 5 (10–30) | 2.5 (1.5–8). |

TABLE 3

| Temp., °C. | Dielectric Constant at 5 volts; 1 Kilocycle | | |
|---|---|---|---|
| | Body No. 7 | Body No. 8 | Body No. 9 |
| 20 | 1,230 | 2,900 | 1,620 |
| 30 | 1,260 | 3,100 | 1,340 |
| 40 | 1,320 | 3,200 | 1,040 |
| 50 | 1,360 | 3,000 | 830 |
| 60 | 1,410 | 2,600 | 740 |
| 70 | 1,580 | 2,300 | 630 |
| 80 | 1,700 | 1,950 | 560 |
| 90 | 1,660 | 1,650 | 500 |
| 100 | 1,540 | 1,400 | 460 |
| 110 | 1,410 | 1,200 | 420 |
| 120 | 1,390 | 1,050 | 400 |

Table 3 indicates the dielectric constants of the alkaline earth titanate bodies Nos. 7, 8 and 9 shown in Tables 1, 1A and 2 at various temperatures at low frequency, and conjointly with the power factor data given in Table 2 illustrates the improved electrical properties of alkaline earth titanate bodies produced in accordance with our invention as compared with the well-known high-peaking dielectric constant characteristics and higher power factors of the commonly known alkaline earth titanate bodies.

The addition of nickel oxide or its equivalent to bodies in accordance with our invention has several advantages. Thus the nickel oxide acts as a flux, although when present only in very small amounts, for example of the order of 0.25% it may not be self-sufficient in this respect unless firing is conducted at a somewhat higher temperature than would be suitable with greater quantities of the nickel oxide or supplementary fluxes. The addition of from 1–2% of nickel oxide to alkaline earth titanate bodies reduces their firing temperatures by 50–200° C. for a given firing cycle. Body No. 10 in the tables may be taken by way of example, having been fired at 1200° C., whereas in the absence of the nickel oxide a temperature of the order of 1350° C. would be necessary.

The elimination of conventional fluxes gives inherently lower power factors at both high and low frequencies, and the lower power factors at high frequency are of primary importance in bodies which in service are likely to be highly stressed at high frequency. In the case of bodies comprising mainly or substantially the alkaline earth titanates, the addition of nickel oxide or its equivalent has the effect of modifying not only their power factors but also their dielectric constant/temperature curves by minimising and/or displacing along the temperature scale the peaks on the curves, thereby enabling closer control of their temperature coefficients. Other materials, for example magnesium zirconate have been proposed for addition to alkaline earth titanate bodies for similar effects, but nickel oxide has the further advantage that firing conditions are less troublesome.

It would appear that when both nickel oxide and zirconia are present in the bodies, the temperature coefficient of their power factor is considerably lower than in most dielectrics of the rutile type. Thus, a body containing both nickel oxide and zirconia has a power factor at 2 megacycles per second of $0.8 \times 10^{-4}$ at 20° C., increasing by about 5% at 80°, and a power factor at 1 kilocycle per second of about $10 \times 10^{-4}$ at 20°, increasing by about 15% at 80° C. In the absence of the nickel oxide and zirconia, the corresponding power factors showed increases of 200% and more.

Good results are obtained when the bodies in accordance with the invention are fired under reducing conditions such as are employed in the firing of hard porcelain. Under such conditions, titania normally tends to assume the well-known semi-conducting form, when its dielectric properties are of course greatly impaired, but such tendency is minimised or completely inhibited in the presence of the nickel oxide.

We claim:

1. A dielectric body constituting a fused product resulting from the firing of a mixture of ingredients comprising predominantly titania and containing 0.25 to 15% by weight of nickel oxide.

2. A dielectric as claimed in claim 1, containing a substance from the group consisting of thoria and zirconia in an amount up to 15% by weight.

3. A dielectric body constituting a fused product resulting from the firing of a mixture of ingredients comprising predominantly titania and containing about 1 to 6% by weight of zirconia and 0.25 to 15% by weight of nickel oxide.

4. A dielectric as claimed in claim 3 in which the zirconia content exceeds the stoichiometric proportions to form nickel zirconate, the excess zirconia being combined with magnesia as magnesium zirconate.

5. A dielectric body constituting a fused product resulting from the firing of a mixture of ingredients comprising predominantly titania and containing about 33 to 60% by weight of barium oxide and 0.25 to 15% by weight of nickel oxide.

6. A dielectric body constituting a fused product resulting from the firing of a mixture of ingredients comprising predominantly titania and containing about 1 to 50% by weight of magnesium oxide and 0.25 to 15% by weight of nickel oxide.

7. A dielectric body constituting a fused product resulting from the firing of a mixture of ingredients comprising predominantly titania and containing up to 2% by weight of tungstic oxide and 0.25 to 15% by weight of nickel oxide.

8. A dielectric body constituting a fused product resulting from the firing of a mixture of ingredients comprising predominantly titania and containing up to 15% thoria and 0.25 to 15% by weight of nickel oxide.

9. A dielectric body constituting a fused product resulting from the firing of a mixture of ingredients comprising predominantly titania and containing an oxide from the group consisting of magnesium oxide, calcium oxide, strontium oxide and barium oxide; and nickel oxide with the nickel oxide content being from 0.25 to 15% by weight as NiO.

10. A dielectric body constituting a fused product comprising predominantly magnesium titanate and containing nickel oxide in an amount between 0.25 to 15% by weight as NiO.

11. A dielectric body constituting a fused product resulting from the firing of a mixture of ingredients comprising predominantly titania and containing nickel oxide and zirconia in the stoichiometric proportions to form nickel zirconate, the minimum nickel zirconate content being the equivalent of 0.25% nickel oxide and the maximum nickel zirconate content being the equivalent of 15% zirconia.

12. A dielectric body constituting a fused product resulting from the firing of a mixture of ingredients comprising 0.25 to 5% by weight of nickel oxide with the remainder of the mixture being substantially titania.

13. A dielectric as claimed in claim 12, wherein the nickel oxide constitutes 1 to 3% by weight of the fused product.

14. A dielectric body constituting a fused product comprising 0.25 to 15% by weight of nickel oxide and 0 to 15% of a compound from the group consisting of thoria and zirconia with the remainder substantially a titanate selected from the group consisting of magnesium, calcium, strontium and barium titanates.

JACK WOODCOCK.
JOHN K. PARIDGE.

REFERENCES CITED

The following references are of record in the file of this patent:

UNITED STATES PATENTS

| Number | Name | Date |
|---|---|---|
| 648,518 | Ochs | May 1, 1900 |
| 2,027,277 | Habann | Jan. 7, 1936 |
| 2,277,733 | Wainer et al. | Mar. 31, 1942 |